United States Patent
Schnizler

(10) Patent No.: US 11,121,950 B2
(45) Date of Patent: Sep. 14, 2021

(54) TRANSPONDER MANAGEMENT TESTING AND INTERACTION TRACING

(71) Applicant: VIAVI SOLUTIONS INC., San Jose, CA (US)

(72) Inventor: Reiner Schnizler, Eningen Unter Achalm (DE)

(73) Assignee: VIAVI SOLUTIONS INC., San Jose, CA (US)

( * ) Notice: Subject to any disclaimer, the term of this patent is extended or adjusted under 35 U.S.C. 154(b) by 0 days.

(21) Appl. No.: 16/738,472

(22) Filed: Jan. 9, 2020

(65) Prior Publication Data
US 2021/0218650 A1    Jul. 15, 2021

(51) Int. Cl.
  *H04L 12/26* (2006.01)
  *H04Q 11/00* (2006.01)

(52) U.S. Cl.
  CPC ............ *H04L 43/065* (2013.01); *H04L 43/14* (2013.01); *H04Q 11/0062* (2013.01); *H04Q 2011/0083* (2013.01)

(58) Field of Classification Search
  CPC .............. H04L 43/14; H04L 43/065; H04Q 2011/0083; H04Q 11/0062
  USPC ........................................................ 709/224
  See application file for complete search history.

(56) References Cited

U.S. PATENT DOCUMENTS

| | | | | |
|---|---|---|---|---|
| 6,644,771 B1 * | 11/2003 | Silverbrook | ............... | B41J 2/14 347/19 |
| 6,758,403 B1 * | 7/2004 | Keys | ..................... | G06K 7/0008 235/462.45 |
| 6,959,126 B1 * | 10/2005 | Lofland | ................ | G01M 11/335 385/16 |
| 7,231,558 B2 * | 6/2007 | Gentieu | ................... | H04L 1/243 714/704 |
| 7,466,922 B2 * | 12/2008 | Pierce | .................... | H04B 10/40 398/135 |

(Continued)

FOREIGN PATENT DOCUMENTS

EP    3282599    2/2018

OTHER PUBLICATIONS

William Walker, "Accelerating Development and Testing of High-Speed Optical Integrated Circuits at Fujitsu-MATLAB & Simulink", Math Works Techical Articles and Newsletters, Jan. 1, 2011, 4 pages.

*Primary Examiner* — Frantz B Jean
(74) *Attorney, Agent, or Firm* — Mannava & Kang, P.C.

(57) ABSTRACT

An apparatus such as an Optical Network Tester (ONT) may include an embedded script interpreter to interpret a script for testing an optical transponder coupled to the ONT. The ONT may identify a control based on a statement included in the script, and cause, via an electrical interface, an interaction with the optical transponder to occur based on the control. The ONT may generate a first timestamped log entry to indicate a timing of the control, detect a data path event associated with the optical transponder, generate a second timestamped log entry to indicate a timing of the data path event, and determine that the data path event was caused by the control based on the first timestamped log entry and the second timestamped log entry. The ONT may further assess operation of the optical transponder based on the determination that the data path event was caused by the control.

19 Claims, 14 Drawing Sheets

(56) References Cited

U.S. PATENT DOCUMENTS

| | | | |
|---|---|---|---|
| 2006/0127036 A1* | 6/2006 | Inoue | G11B 27/031 386/264 |
| 2011/0091208 A1* | 4/2011 | Mayor | H04B 10/272 398/38 |
| 2013/0330079 A1* | 12/2013 | Kauffeldt | H04J 14/0221 398/79 |
| 2014/0257889 A1* | 9/2014 | Ashley, Jr. | G07C 9/28 705/7.11 |
| 2015/0222385 A1* | 8/2015 | Ponzini | H04B 10/572 398/83 |
| 2016/0084907 A1 | 3/2016 | Schnizler et al. | |
| 2019/0140738 A1 | 5/2019 | Zeng et al. | |
| 2019/0278645 A1 | 9/2019 | Hsu et al. | |

* cited by examiner

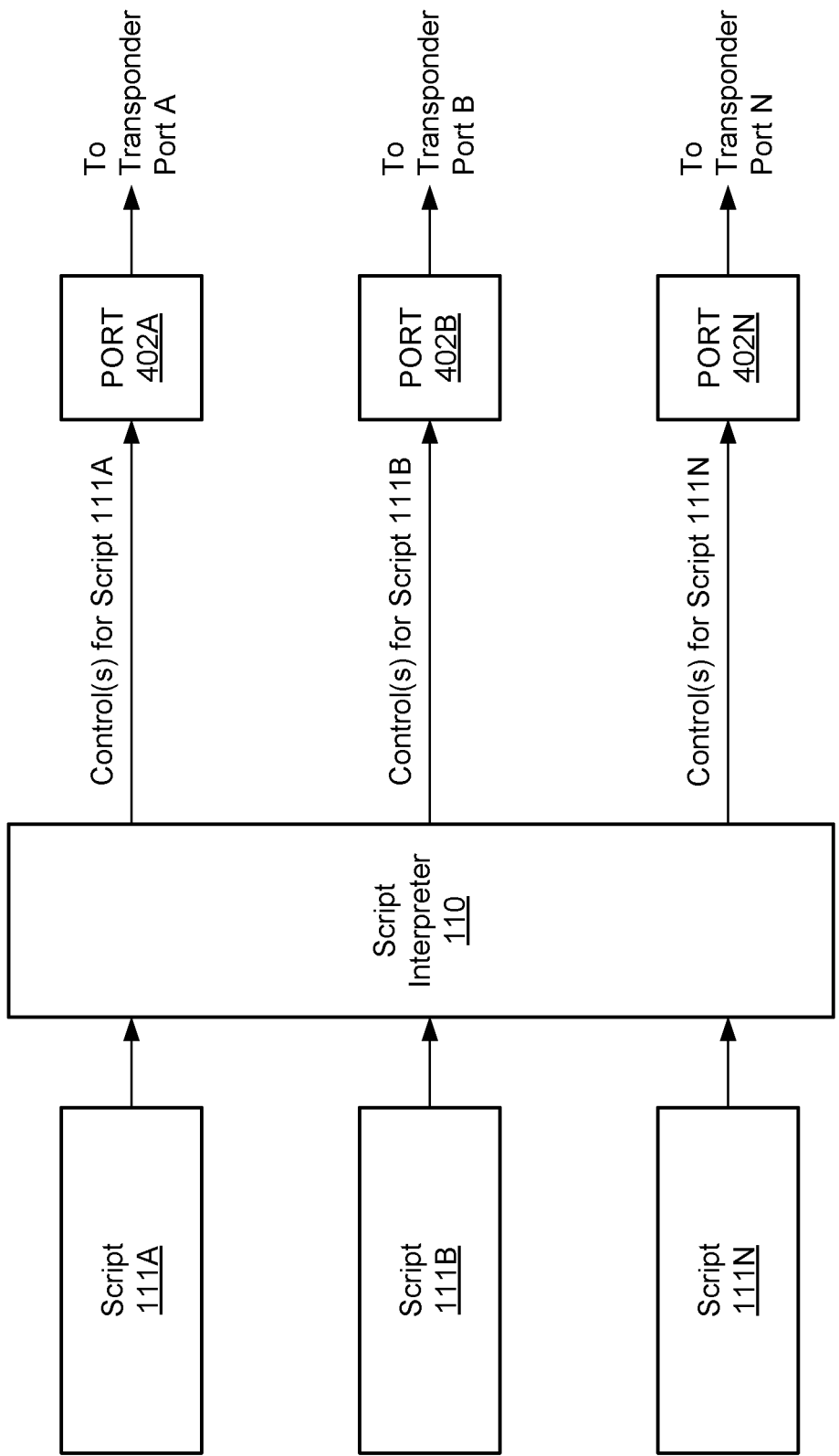

*500*

---

Interpret a script to identify a control for an optical transponder based on a statement included in the script
502

↓

Cause, via an electrical interface, an interaction with the optical transponder to occur based on the control
504

↓

Generate a first timestamped log entry to indicate a timing of the control
506

↓

Detect a data path event associated with the optical transponder
508

↓

Generate a second timestamped log entry to indicate a timing of the data path event
510

↓

Determine that the data path event was caused by the control based on the first timestamped log entry and the second timestamped log entry
512

↓

Assess operation of the optical transponder based on the determination that the data path event was caused by the control
514

TRANSPONDER MANAGEMENT TESTING AND INTERACTION TRACING

BACKGROUND

Optical transponders may send and receive optical signals from a fiber optic network. Optical transponders may provide electrical and optical serial conversions, serialization and deserialization, and control and monitoring of optic signals. Thus, optical transponders are playing an increasingly important role in optical networks.

BRIEF DESCRIPTION OF THE DRAWINGS

Features of the present disclosure may be illustrated by way of example and not limited in the following figure(s), in which like numerals indicate like elements, in which:

FIG. 4 shows an example data flow diagram of parallel script execution in a multiport environment;

FIG. 5 depicts an example method of transponder management testing and interaction tracking;

DETAILED DESCRIPTION

Figure 1:
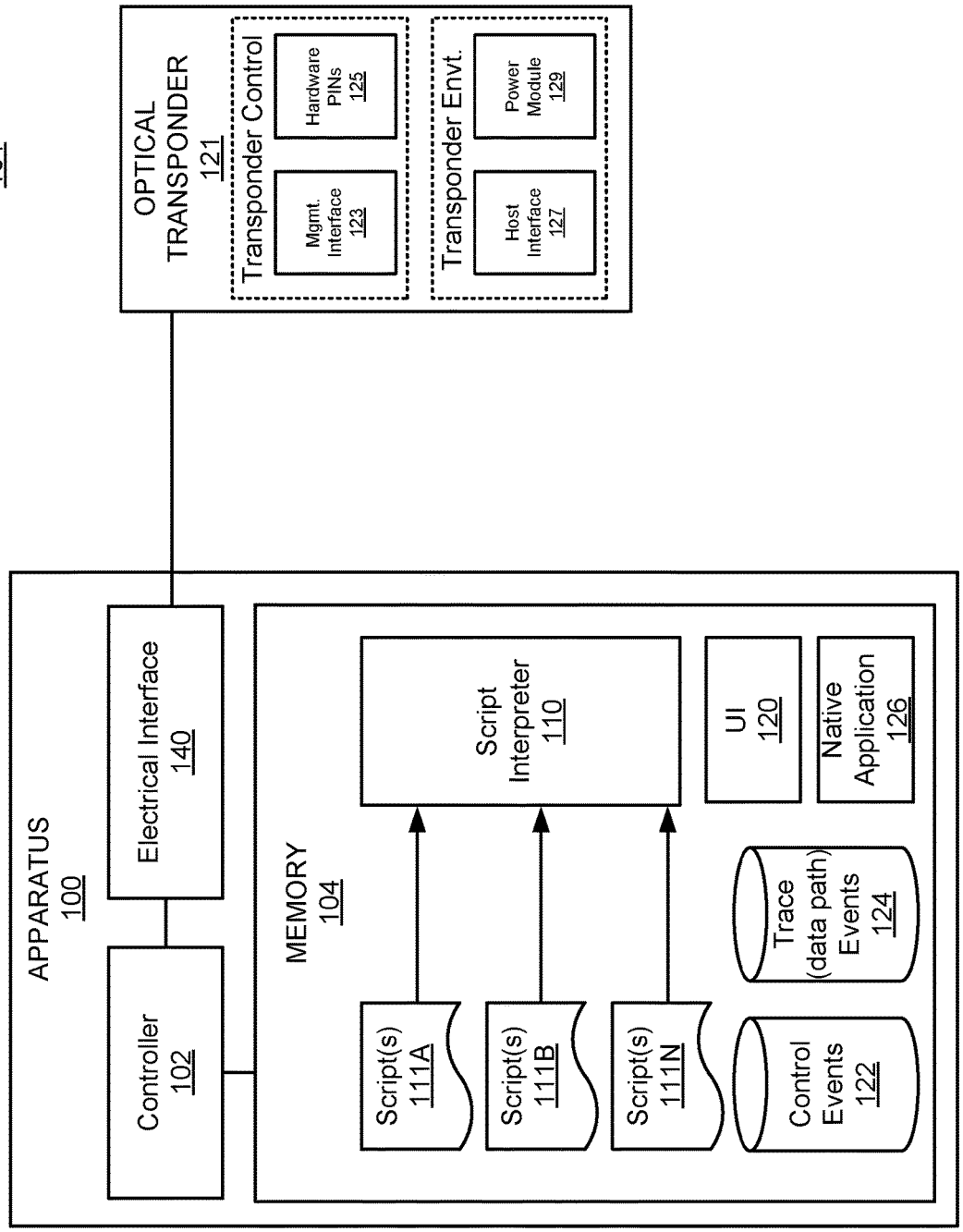
FIG. 1 shows a block diagram of an example system for transponder management testing and interaction tracking.

For simplicity and illustrative purposes, the present disclosure may be described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" may be intended to denote at least one of a particular element. As used herein, the term "includes" means includes but not limited to, the term "including" means including but not limited to. The term "based on" means based at least in part on.

Optical transponders, such as those for 400 Gigabit per second (Gbit/s) transmission rates and above, have a complex built-in management functionality. This complexity is primarily caused by functionality like breakout with multiple independent data paths, Optical Transport Network (OTN) and Ethernet multi-client mapping and multiplexing as well as coherent optics for medium and long reach. Furthermore, these optical transponders (also referred to herein throughout as "transponders" for convenience) may include complex Digital Signal Processing (DSP) chips that may be controlled and managed by the transponder firmware.

This functional complexity has forced the industry to develop new management standards such as Common Management Interface Standard (CMIS), coherent CMIS (C-CMIS) as well as to extend existing standards like the C form-factor pluggable (CFP) Multi-Source Agreement (MSA) standard. These new management standards may, in turn, use complex data models and define the transponder functional behavior in terms of complex state machines. In some cases, the behavioral definition encompasses multiple interacting state machines. The rules governing these interactions are comprehensive and often difficult to understand. In addition to the logical behavior, timing may play an important role. As a result of these and other issues, the industry has run into problems implementing these management standards. Incomplete and flawed standards, difficulties in standards interpretation, implementation bugs and subtle timing difficulties have caused interoperability and stability issues. Comprehensive test and verification are challenging because test instruments do not offer the required functionality. In addition to functional testing, there may be a need for management stress testing since CPUs embedded in the transponders may be overwhelmed by the various tasks which need to be executed in time and sometimes in parallel.

The issues are likely to worsen as transponder complexity rises. This will lead to even more complex management functionality and a possible move from the current register-based management interface model to a message-based interface model. Thus, what may be needed is an improved apparatus such as a test instrument with the capability to perform comprehensive, repeatable and detailed functional and stress tests of transponder management functionality.

The disclosure relates to an improved apparatus and methods that may embed a script interpreter to interpret and run scripts that may control underlying optical transponder functionality through direct transponder hardware and transponder pin accesses in a way that abstracts the complexities of transponder management through a scripting language. The script interpreter and the scripting language may facilitate detecting run time errors when executing transponder hardware accesses, control the transponder via the management interface, control the transponder hardware pins, control the transponder environment, manipulate transponder host interface signals, and manipulate the transponder power supply. The transponder environment may also encompass the media interface signals.

The apparatus may further monitor and trace interactions between the apparatus and the transponder. Such interactions may take place via the management interface, the host interface, the transponder hardware pins, and/or the transponder power supply (such as when a transponder power-on cycle is tested by a script). The apparatus may further monitor and trace the transponder data path to assess the impact of transponder control by the script on the data path.

The foregoing may be implemented in a test instrument such as an Optical Network Tester (ONT) device through a script interpreter embedded in the instrument. The interpreter may have access to functional blocks embedded in the test instrument, such as a transponder management interface, a host interface, a transponder power supply control, an interface to control transponder hardware pins, an interface to obtain the status of transponder hardware pins, and/or other functions.

In an example operation, a user may define tests by writing suitable scripts in a script (or scripting) language. The script language may be a standard language with extensions (such as the Tcl programming language) or a custom language.

The behavior of the transponder may be tested by running test scripts and by analyzing the resulting traced data. This mechanism can be used for functional testing as well as for stress testing. The foregoing may facilitate precise timing of the controls and precision time correlation of control events with data path events.

FIG. 1 shows a block diagram of an example system 101 for transponder management testing and interaction tracking. System 101 may include an apparatus 100, which may be coupled to an optical transponder 121 via an electrical interface 140. In some examples, the apparatus 100 may interact with the optical transponder 121 through controls. For example, the apparatus 100 may generate and transmit one or more controls to exert operation over the transponder controls and/or the transponder environment. Various types (form factors) of optical transponders 121 may be used. For example, the types of optical transponders 121 may include, Quad Small Form-factor Pluggable (QSFP), QSFP+, QSFP28, QSFP double density (QSFP-DD), QSFP56, QSFP-DD.ZR, C form-factor pluggable 2 (CFP2), CFP2-DCO, small form-factor pluggable (SFP), SFP+, SFP28, SFP56, and/or others.

Different types of optical transponders may implement different transponder controls and transponder environments. As such, operational control over the optical transponder 121 may depend on the type of the optical transponder 121. The transponder controls may include the management interface 123 and hardware pins 125 of the optical transponder 121. The management interface 123 may implement various management standards such as, for example, SFF-8636, CMIS, C-CMIS, CFP MSA, SFF-8472, and/or others. The transponder environment may include the host interface 127 and power module 129 of the optical transponder 121.

To facilitate the foregoing, the apparatus 100 may include a controller 102, a memory 104, and an electrical interface 140. As shown in FIG. 1, the apparatus 100 may include a controller 102 that may control the apparatus 100. The controller 102 may be a semiconductor-based microprocessor, a central processing unit (CPU), an application specific integrated circuit (ASIC), a field-programmable gate array (FPGA), and/or other suitable hardware device. Although the apparatus 100 has been depicted as including a single controller 102, it should be understood that the apparatus 100 may include multiple controllers, multiple cores, or the like, without departing from the scopes of the apparatus 100 disclosed herein.

The apparatus 100 may include a memory 104 that may have stored thereon machine-readable instructions (which may also be termed computer readable instructions) that the controller 102 may execute. The memory 104 may be an electronic, magnetic, optical, or other physical storage device that includes or stores executable instructions. The memory 104 may be, for example, Random Access memory (RAM), an Electrically Erasable Programmable Read-Only Memory (EEPROM), a storage device, an optical disc, and the like. The memory 104 may be a non-transitory machine-readable storage medium, where the term "non-transitory" does not encompass transitory propagating signals.

In some examples, the memory 104 may store a plurality of scripts 111 (illustrated in FIG. 1 as scripts 111A-N). In some examples, some or all of the scripts 111 may be interpreted by a script interpreter 110 into machine instructions that are executable by the controller 102 at runtime. In other examples, some or all of the scripts 111 may be compiled into binary or machine code (such as prior to runtime) that is executable by the controller 102. In some examples, the script interpreter 110 may itself include instructions stored at the memory 104 and executed by the controller 102. In other examples, the script interpreter 110 may include a hardware processor (separate from the controller 102) that interprets the scripts 111.

In some examples, the script interpreter 110 may generate, based on the interpreted scripts 111, controls to cause interactions with the optical transponder 121. Such controls may be stored as first timestamped log entries in the control events 122 datastore. In some examples, the script interpreter 110 and/or a native application 126 on the apparatus 100 may monitor data path events and generate second timestamped log entries for the data path events. The native application 126 may include instructions that program the controller 102 to perform apparatus-specific operations. For example, for implementations in which the apparatus 100 is an Optical Network Tester (ONT) device, the native application 126 may provide ONT-specific functions.

The second timestamped log entries may be stored in the trace events 124 datastore. In this manner, controls initiated based on scripts 111 may be timestamped and correlated with timestamped data path events to determine whether or not the controls caused the data path events. Thus, in these examples, the scripts 111 may encode testing operations for testing the optical transponder and assess results of the testing through generation of controls that cause interactions with the optical transponder 121 and monitored data path events that may result from the controls.

Examples of operations and traceability of the operations supported by a script language for a script 111 is described in Table 1. Other numbers and types of operations may be used in the script language as well. As such, Table 1 is provided for illustrative, and not necessarily limiting, purposes.

TABLE 1

| Operation | Traceable? | Description |
| --- | --- | --- |
| Read register | Y | Read a transponder register |
| Write register | Y | Write to a transponder register |
| Set pin | Y | Set a transponder hardware pin to a defined value (high/low) |
| Get pin | Y | — |
| Tx Host interface lane mute | Y | Muting of host interface lanes |
| Tx Host interface lane unmute | Y | Unmuting of host interface lanes |
| Reset transponder | Y | Transponder hardware reset |
| Interaction tracing on | N | Turn transponder interaction tracing on |
| Interaction tracing off | N | Turn transponder interaction tracing off |
| Abort script | N | Terminate script execution |
| Make decision | N | IF . . . THEN . . . ELSE |
| Jump/branch/loop | N | — |
| Store values | N | Variables |
| Wait a user defined time | N | Resolution: 10 ms Range: 10 . . . 300000 ms (5 min) |
| Logical operators | N | Used in boolean expressions |
| Comparison | N | Used in boolean expressions |
| Arithmetic operators | N | Used in arithmetic expressions |

TABLE 1-continued

| Operation | Traceable? | Description |
|---|---|---|
| Constants | N | Default radix: Decimal<br>Supported radix:<br>Decimal<br>Binary<br>Hexadecimal |
| Comment | N | — |
| Print value some output. | N | Print the value of a variable or a constant to |

Figure 2:
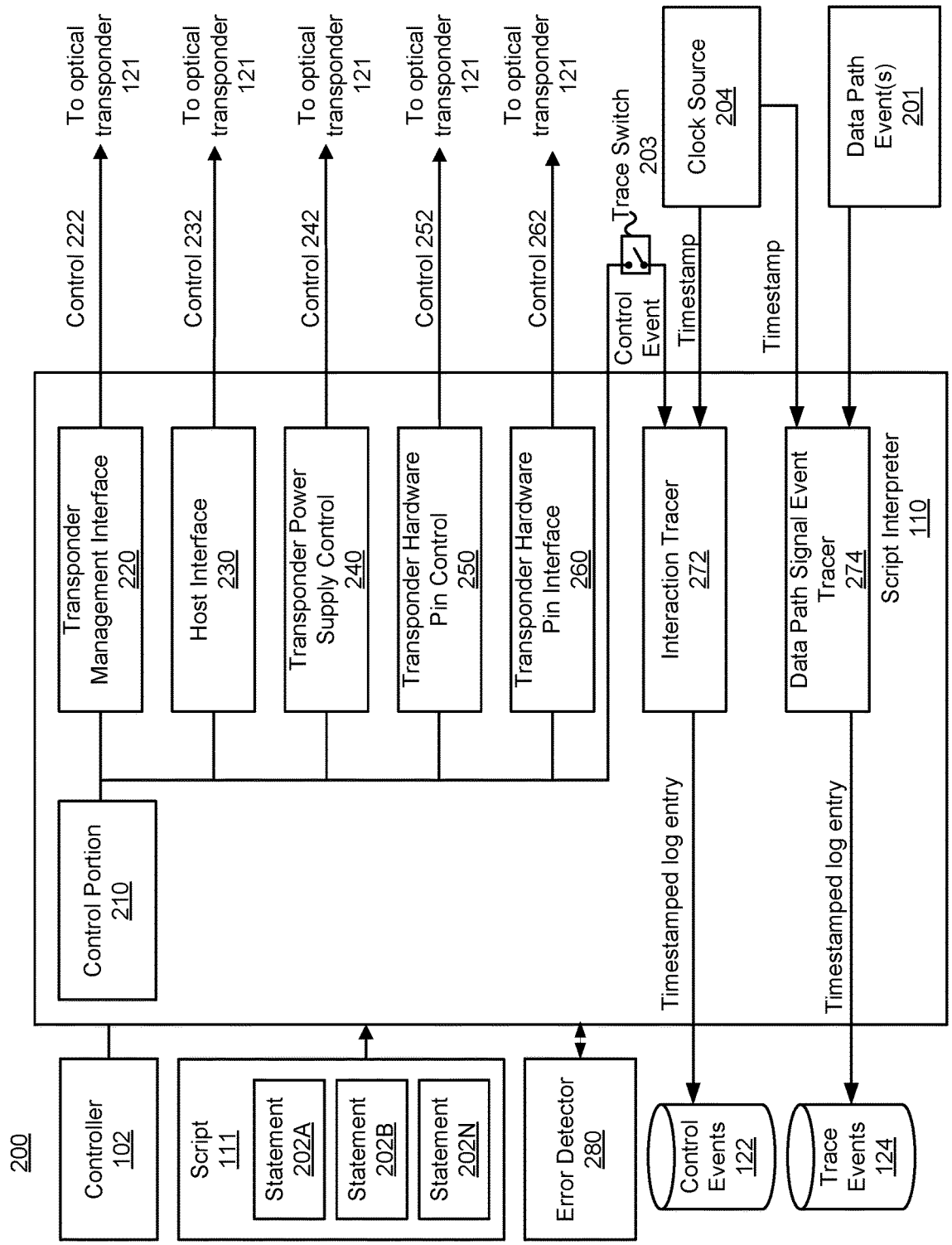
FIG. 2 shows an example data flow diagram of a script interpreter that interprets statements of a script and generates controls for transponder management testing and interaction tracking.

FIG. 2 shows an example data flow diagram 200 of a script interpreter 110 that interprets statements 202A-N of a script 111 and generates controls 222, 232, 242, 252, and/or 262 for transponder management testing and interaction tracking. In some examples, each statement 202 may encode an operation (such as an operation listed in Table 1 and/or other operation) to be performed with respect to the optical transponder 121. Examples of statements are listed in Table 2. Other numbers and types of operations and statements may be used in the script 111. As such, Table 2 is provided for illustrative, and not necessarily limiting, purposes.

TABLE 2

| Operation | Statement | Comment |
|---|---|---|
| Read registers | var_name = REG[u] reg_reference<br>var_name = REGs reg_reference | Default: Unsigned<br>Data is converted to internal format |
| Write registers REG[u] | reg_reference = var_name or constant<br>REGs reg_reference = var_name or constant | Default: Unsigned<br>Data is converted to bitfield format<br>If signed/unsigned is not specified, the sign of the data is preserved. In other words, the bitfield is assumed to have the same sign as the data. Raise error if conversion is not possible (range check including sign) |
| Set pin | PIN pin_name = LOW or HIGH | Pin names depend on the transponder type. Names are predefined. |
| Get pin | PIN pin_name | Result is LOW or HIGH.<br>Used in boolean expressions |
| Interaction tracing on | TRACE ON | Turn transponder interaction tracing on |
| Interaction tracing off | TRACE OFF | Turn transponder interaction tracing off |
| Host interface Tx lane mute | Tx HOST LANE lane_no_reference = MUTE | Muting of host interface lanes |
| Host interface Tx lane unmute | Tx HOST LANE lane_no_reference = UNMUTE | Unmuting of host interface lanes |
| Reset transponder | RESET | — |
| Abort script | ABORT | Aborts script |
| Make decision | IF boolean_expression THEN statement [ELSE statement] | IF cannot be nested<br>Only one statement per THEN/ELSE |
| Jump/branch/loop | — | — |
| Store values (assignment) | var_name = arithmetic_expression | User specified name. Variable names must begin with a letter.<br>No declaration required<br>Auto initialized (=0) |
| Wait | WAIT duration | Resolution: 100 ms<br>Range: 100 . . . 300000 ms (5 min) |
| Logical operators | AND, OR, NOT | Used in boolean expressions |
| Comparison | <, <=, >=, >, ==, != | Used in boolean expressions |
| Arithmetic operators | +, -, *, /, | Integer arithmetic<br>Used in arithmetic expressions |
| Constants | numerical_value[d]<br>numerical_valueb<br>numerical_valueh | Default radix: Decimal<br>Supported radix:<br>Decimal<br>Binary<br>Hexadecimal |
| Comment | # | — |
| Print value | PRINT variable or constant [FORMAT format_id] | Print the value of a variable or a constant to some output.<br>format_id:<br>Default: Decimal (d)<br>d - decimal, leading zeros are suppressed<br>b8 - 8 bit binary<br>b16 - 16 bit binary<br>b24 - 24 bit binary<br>b32 - 32 bit binary |

TABLE 2-continued

| Operation | Statement | Comment |
|---|---|---|
| | | b64 - 64 bit binary |
| | | h2 - 2 digit hex |
| | | h4 - 4 digit hex |
| | | h6 - 6 digit hex |
| | | h8 - 8 digit hex |
| | | h16 - 16 digit hex |
| | | Binary/hex: |
| | | Positive number: Leading zeros are printed |
| | | Negative number: Leading ones are printed |
| | | A warning is issues in case relevant digits are not printed |

Regardless of the particular statements 202 and operations encoded by the statements 202, each script 111 may be structured in a uniform way to facilitate compliance by script developers. In an example script structure, a single statement 202 per line may be permitted, and each statement 202 may be numbered according to a corresponding line number. Thus, in this example, an end of line may terminate a statement 202. In some examples, the maximum size of register references may be 64 bits and the internal data format may be a 65-bit signed integer (64-bit unsigned bits for C-CMIS management interfaces). In some examples, data read from/written to bitfields may be converted to/from the internal data format. Signed bitfields may be assumed to be in two's complement format. It should be noted that other script structures may be used as well. Thus, the foregoing example structure is provided for illustration and not necessarily for limitation.

Regardless of the particular script structure, a control portion 210 of the script interpreter 110 may interpret the script 111, and generate a control 222, 232, 242, 252, and/or 262 that corresponds to the operation encoded by a statement 202 in the script 111. For example, the control portion 210 may interface with the optical transponder 121 via transponder management interface 220, host interface 230, transponder power supply control 240, transponder hardware pin control 250, transponder pin interface 260, and/or other control portions to generate the control 222, 232, 242, 252, and/or 262. A control may be an electronically communicated instruction to perform an operation. In an example, the operation may be an operation in an optical transponder such as operations listed in Table 1.

In some examples, the transponder management interface 220 may generate management controls (such as control 222) to the optical transponder 121. The control 222 may control registers of the optical transponder 121 to control management operations. In some examples, the transponder management interface 220 of the script interpreter 110 may switch to a message-based control of the optical transponder 121 from a register-based control as appropriate and without having to change current scripts 111. In other words, a shift from register-based control to message-based control may be supported through the transponder management interface 220 without having to change scripts 111 to accommodate the shift.

In some examples, the transponder management interface 220 may be encoded with register references that may be specific to optical transponders and types of modes or standards employed by the optical transponders. In some examples, a maximum data size of register references is 64 bits. As will be described further with respect to FIG. 3, there may be various types of scripts (or "script types") depending on the type of optical transponder or standards employed by the optical transponder. The script interpreter 110 (and in particular the transponder management interface 220 of the script interpreter 110) may use various register references based on the script type.

For example, I2C script types may be employed for I2C modes used in QSFPxx types of transponders. With these transponders, registers may be organized in a bank-page-byte structure. Registers may be 8 bits wide. For examples in which register references involve multiple registers, particular access sequences may be used to guarantee data consistency. An example syntax is provided for illustration:

reg_reference=bitfield_reference or byte_reference
   byte_reference=[[bank_no]:page_no]:[high_byte_addr-]low_byte_addr
   bitfield_reference=[[bank_no]:page_no]:byte_addr.[high_bit_offset-]low_bit_offset Table 3 is provided to show example I2C word and bitfield reference ranges:

| Item | Range | Radix | Default |
|---|---|---|---|
| bank_no | 0 . . . 255 | Default radix: Decimal<br>Supported radix:<br>Decimal (d)<br>Hexadecimal (h) | If omitted, bank 0 is used |
| page_no | 0 . . . 255 | Default radix: Decimal<br>Supported radix:<br>Decimal (d)<br>Hexadecimal (h) | If omitted, page 0 is used |
| byte_addr | 0 . . . 255 | Default radix: Decimal<br>Supported radix:<br>Decimal (d)<br>Hexadecimal (h) | Note: Byte addresses 0-127 access the lower page. Byte addresses 128-255 access the specified page. The lower page may not be banked. In other words, for byte addresses < 128 the bank and page number may not matter. |
| bit_offset | 0 . . . 7 | NA | If omitted, bits 7 . . . 0 are used |

Table 4 is provided to show I2C word and biffield reference examples:

| Example | Meaning |
|---|---|
| 1:3h:177.0 | Bank 1, page 3, byte 177, bit 0 |
| 1:3h:77.0 | Lower page, byte 77, bit 0 |
| 77.0 | Lower page, byte 77, bit 0 |

-continued

| Example | Meaning |
| --- | --- |
| 4h:220.4 | Bank 0, page 4h, byte 220, bit 4 |
| 220.4 | Bank 0, page 0, byte 220, bit 4 |
| 220 | Bank 0, page 0, byte 220, bit 7-0 |
| 1:3h:177 | Bank 1, page 3, byte 177, bit 7-0 (8 bit) |
| 1:3h:177.4-1 | Bank 1, page 3, byte 177, bits 4-1 (4 bit) |
| 3h:176-177 | Bank 0, page 3, bytes 177 bit 7-176 bit 0 (16 bit) |

Management Data Input/Output (MDIO) CFPx script types may be employed for MDIO modes used in CFPx type of transponders. With these transponders, registers may be organized in a linear fashion. Registers may be 16 bits wide. For examples in which register references involve multiple registers, particular access sequences may be used to guarantee data consistency. An example syntax is provided for illustration:

reg_reference=bitfield_reference or word_reference
word_reference=[high_word_addr-]low_word_addr
bitfield_reference=word_addr.[high_bit_offset-]low_bit_offset Table 5 is provided to show MDIO bitfield reference ranges:

| Item | Range | Radix | Default |
| --- | --- | --- | --- |
| word_addr | 0 . . . 65535 | Default radix: Decimal Supported radix: Decimal (d) Hexadecimal (h) | — |
| bit_offset | 0 . . . 15 | Default radix: Decimal Supported radix: Decimal (d) Hexadecimal (h) | If omitted, bits 15 . . . 0 are used |

Table 6 is provided to show MDIO word and bitfield reference examples:

| Example | Meaning |
| --- | --- |
| 8000h.0 | Word 8000h, bit 0 |
| 8000h | Word 8000h, bits 15-0 (16 bit) |
| B400h.4-1 | Word B400h, bits 4-1 (4 bit) |
| B400h-B401h | Word B401h bit 15 - word B400 h bit 0 (32 bit) |

In some examples, access to registers in the B000h page may require write flow control. Write flow control may be provided by checking the status of a particular bit (the ready bit). In these examples, the script interpreter 110 may handle write flow control so that the script 111 need not include flow control related statements.

In some examples, bitfield reference write accesses may be executed as read-modify-write sequences. In contrast, byte (I2C) or word (MSA) write access may not be executed as read-modify-write sequences, but rather as simple writes.

In some examples, the host interface 230 may generate host interface controls (such as control 232) to the optical transponder 121. To do so, the script interpreter 110 (and in particular the host interface 230) may be embedded with host interface lane references. For example, host interface lanes may be referenced by physical lane number. An example syntax is provided below:

Host_interface_lane_reference=single_lane_reference or lane_range_reference
single_lane_reference=lane_number
lane_range_reference=high_lane_number-low_lane_number Table 7 is provided to show host interface lane number range examples:

| Script type | Host lane number range | Comment |
| --- | --- | --- |
| I2C SFF-8636 | 0 . . . 3 | — |
| I2C CMIS | 0 . . . 7 | — |
| MDIO CFPx | 0 . . . 7 | — |

Table 8 is provided to show host interface lane reference examples:

| Example | Meaning |
| --- | --- |
| Tx HOST LANE 3 = MUTE | Tx host lane 3 is muted |
| Tx HOST LANE 7-0 = MUTE | All Tx host lanes are muted |

In some examples, the transponder power supply control 240 may generate power supply manipulation controls (such as control 242) to the optical transponder 121. Such controls may include power on and off controls for the power supply of the optical transponder 121.

In some examples, the transponder hardware pin control 250 may generate pin manipulation controls (such as control 252 to set pin configurations) to the optical transponder 121. In some examples, the transponder pin interface 260 may generate pin interface controls (such as control 262 to get pin status information) to the optical transponder 121.

Table 9 is provided to show I2C QSFPx mode supported hardware pins (Script types I2C SFF-8636 and I2C CMIS):

| Pin | Set/Get | Comment |
| --- | --- | --- |
| LPMode | Set | Low power mode (low = low power) |
| ModPrsL | Get | Module present (low = present) |

Table 10 is provided to show MDIO mode supported hardware pins (Script types CFPx):

| Pin | Set/Get | Comment |
| --- | --- | --- |
| MOD_LOPWR | Set | Low power mode (low = low power) |
| TX_DIS | Set | Tx disable (low = disable) |
| MOD_ABS | Get | Module Absent (low = present) |
| RX_LOS | Get | Rx loss of signal (low = OK) |
| GLB_ALRMn | Get | Global alarm (low = alarm condition) |

The controller 102 and/or the script interpreter 110 may provide the control 222, 232, 242, 252, and/or 262 to the optical transponder (such as the optical transponder 121 illustrated in FIG. 1) such as via the electrical interface 140 (illustrated in FIG. 1). In some examples, script triggered interactions with the optical transponder 121 may be traceable.

For example, a trace switch 203 may be implemented as a software-based or an electrical switch that may turn on or off interaction tracing of control events. A control event may include a transmission of control 222, 232, 242, 252, and/or 262 to the optical transponder 121. Control events may also be referred to as transponder interactions since they cause interactions with the optical transponder.

The trace switch 203 may be enabled or disabled from the script 111, from the native application 126, based on user input (such as via UI 120), and/or other source. Interaction tracing is enabled/disabled from script. With interaction tracing enabled, transponder interactions may be time-stamped and logged by the interaction tracer 272 in the control events 122 datastore, which may include a list of transponder interactions. For example, the interaction tracer 272 may obtain an indication of a control event from the control portion 210, a timestamp from the clock source 204, and generate a timestamped log entry that identifies the control event and the time that such control event occurred.

In some examples, only interactions triggered by control events determined from the script 111 may be logged. In these examples, ONT background interactions may not be logged. Interaction tracing by the interaction tracer 272 may provide a timestamped log of transponder interactions, which may facilitate correlation of control events with data path events (e.g. errors and alarms), and aid in debugging scripts 111. In some examples, the resolution of timestamps from the clock source 204 may be 10 milliseconds (ms), although other resolutions may be used as well. Various types of control events may be traced, such as register accesses, pin accesses, host interface settings or other manipulations; power events (such as transponder resets), and/or other types of control events described herein.

In some examples, physical transactions may be traced and logged. In these examples, register read/writes may be bytes (for I2C modes) or words (for MDIO modes). In some examples, bitfield notation may not be used in the control events 122 datastore logs.

In some examples, bitfield write statements may be executed as read-modify-write sequences. Therefore, they may generate two entries in the control events 122 datastore logs. A first entry may be made for the read access and a second entry may be made for the subsequent write access. In some examples, host interface controls may be logged with a lane bitmask value. The bitmask may indicate whether the operation is applicable (bit set to 1) to a certain lane or not (bit set to zero).

In some examples, the data path signal event tracer 274 may monitor data path events, and generate timestamped entries that indicate the data path event 201 and a time at which the data path event occurred. The timestamped entries may be stored in trace events 124 data store. It should be noted that the data path signal event tracer 274 may be part of the script interpreter 110, the native application 126 (illustrated in FIG. 1) and therefore may be a "native data path tracer", and/or the controller 102.

In some examples, the error detector 280 may correlate the timestamped entries in the control events 122 datastore and the trace events 124 datastore to determine whether a given control caused a given data path event. Such determination may be based on correlating a time of the given data path event occurring within a maximum time after the given control.

Figure 3:
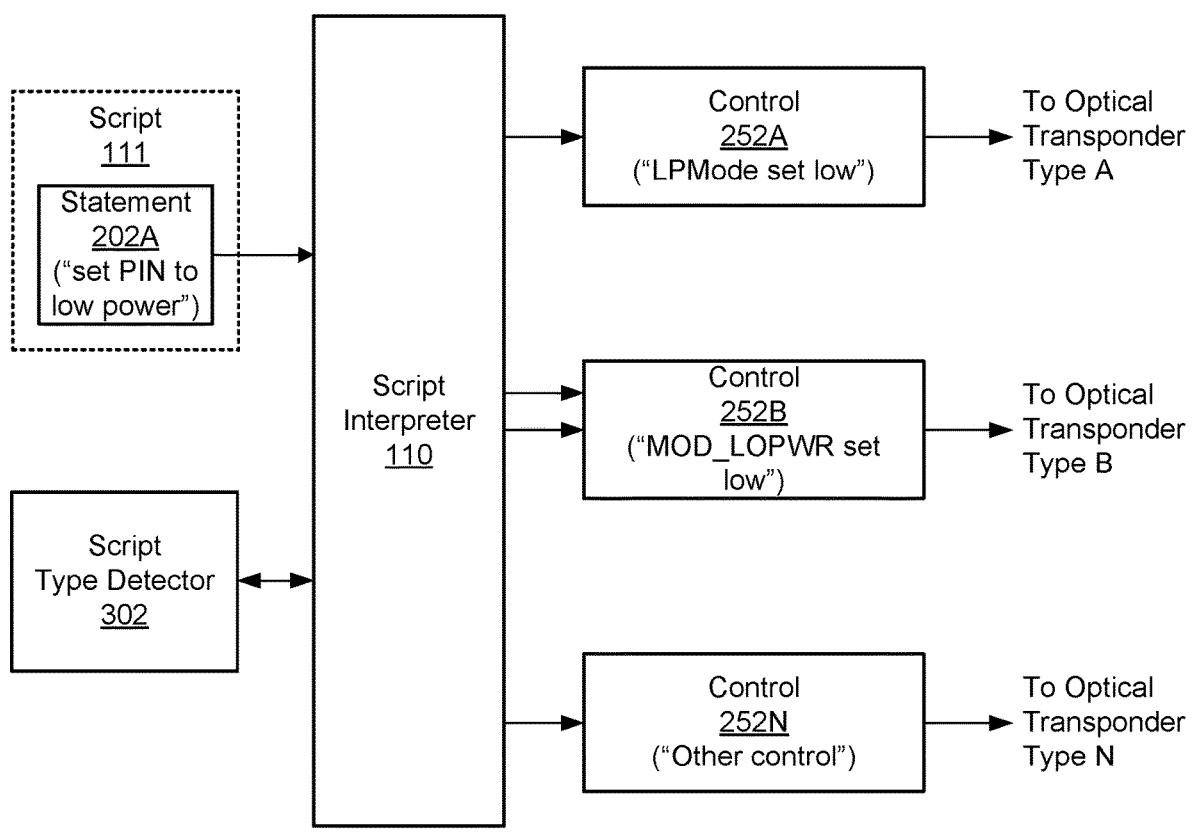
FIG. 3 shows an example data flow diagram of generating different controls from a statement based on a script type.

FIG. 3 shows an example data flow diagram 300 of generating different controls from a statement based on a script type. The script type may determine script language features such as a format of register references, permitted pins in set/get pin operations, host interface lane range, which transaction data (control events) may be traced, and/or other features. In some examples, the script type may be determined based on various modes of operation, such as "Manual," "Semi-Manual," "Automatic," and "Unmanaged." In Manual mode, the script type detector 302 may detect the script type based on input from the user such as input via UI 120 illustrated in FIG. 1. In "Semi-Manual", the script type detector 302 may infer the script type based on information from the user such as input via UI 120. In "Auto" mode, the script type detector 302 may detect the script type based on information from the optical transponder 121. In "Unmanaged" mode, the script type detector 302 may infer the script type from the port type used to connect to the optical transponder 121. Various transponder types (illustrated as Types A-N in FIG. 3) may be supported.

Table 11 is provided to show supported transponder and script types:

| Transponder Type | Management standard | script type |
|---|---|---|
| QSFP, QSFP+, QSFP28 | SFF-8636 | I2C SFF-8636 |
| QSFP-DD, QSFP56 | CMIS | I2C CMIS |
| QSFP-DD .ZR | CMIS, C-CMIS | I2C CMIS |
| CFP2, CFP2-DCO | CFP MSA | MDIO CFPx |
| SFP, SFP+, SFP28, SFP56 | SFF-8472 | I2C SFF-8472 |
| SFP-DD | SFD-DD MSA | I2C SFP-DD |
| DSFP | ACMIS | I2C DSFP |

In examples, the script interpreter 110 may interpret the script 111 based on the script type. The script interpreter 110, subject to the script type, may generate a control 252 (illustrated as one of controls 252A-N) based on a statement 202A and the script type. In some examples, the control 252 may be constrained by various script language features that are based on the script type. Thus, statements 202 may be interpreted in accordance with and constrained by the script type.

FIG. 4 shows an example data flow diagram 400 of parallel script execution in a multiport environment. In some examples, scripts 111 may be executed (interpreted by the script interpreter 110 and then executed at the apparatus 100). For examples, as illustrated, multiple scripts 111A-N may be executed in parallel on multiport 402A-N modules. In some examples (not illustrated) a single script 111 may be forked to run in parallel on multiple ports 402A-N. In this manner, a given script 111 may include multiple statements that each are intended to run in parallel in the multiport environment.

Various manners in which the apparatus 100 may operate to control the optical transponder 121 are discussed in greater detail with respect to the method 500 depicted in FIG. 5. It should be understood that the method 500 may include additional operations and that some of the operations described therein may be removed and/or modified without departing from the scopes of the method 500. The description of the method 500 may be made with reference to the features depicted in FIGS. 1-4 for purposes of illustration.

FIG. 5 depicts an example method 500 of transponder management testing and interaction tracking. The method 500 may be implemented by the controller 102 of the apparatus 100, which may include an electrical interface (such as electrical interface 140) to couple the apparatus 100 to an optical transponder (the optical transponder 121) and a memory (such as the memory 104) to store a script (such as script 111) written in a scripting language. The script may encode a test of the optical transponder. The test may include a plurality of interactions with the optical transponder to be traced and analyzed.

As shown in FIG. 5, for example, at block 502, the method 500 may include interpreting the script to identify a control for the optical transponder based on a statement included in the script. In some examples, to interpret the script, the method 500 may include identifying a script type for the script. Identifying the script type may be performed in various ways. For example, to identify the script type, the method 500 may include accessing an input (e.g., an input from a user and/or an indication in the script that specifies the script type) that specifies the script type, automatically identifying the script type based on the optical transponder (such as based on a type of optical transponder), and/or inferring the script type based on a type of port (port type) used for coupling to the optical transponder (which may indicate a type of optical transponder and/or management interface used by the optical transponder). A type of port may include the form factors used to connect the optical transponder to the apparatus, such as the ONT device. Examples of form factors are illustrated in Table 11 under "Transponder Type."

The script type may dictate a plurality of language features for the script interpreter such that each language feature of the plurality of language features dictates a characteristic related to the optical transponder. Examples of characteristic include, without limitation, a format of register references, allowed pins in set or get pin operations, host interface lane range, traced transactions data (types of data path events that may be traced), and/or other characteristic.

In some examples, the statement may encode a control of the optical transponder. At block 504, the method 500 may include causing, via the electrical interface, an interaction with the optical transponder to occur based on the control. For example, the method 500 may generate a control (such as a control 222, 232, 242, 252, and/or 262) and transmit the control to the optical transponder, which may act based on or otherwise execute the control.

The interaction may include, for example, a management interface operation (caused by a control from the transponder management interface 220) that reads from or writes to a register of the optical transponder. In another example, the interaction may include a transponder hardware pin control (caused by a control from the transponder hardware pin control 250) that sets or gets a value of a hardware pin (such as a value of "high" or "low"). In yet another example, the interaction may include a host interface operation (caused by a control from the host interface 230) that manipulates a host interface signal of the optical transponder (such as muting or unmuting the host interface). In still another example, the interaction may include a transponder power supply control (caused by a control from the transponder power supply control 240) that manipulates a power supply of the optical transponder (such as turning on or off).

Regardless of the identified control, at block 506, the method 500 may include generating a first timestamped log entry to indicate a timing of the control. For example, the method 500 may include obtaining a first timestamp from a clock source 204 and generating the first timestamped log entry with the first timestamp and information indicating the identified control.

At block 508, the method 500 may include detecting a data path event (such as a data path event 201) associated with the optical transponder. The data path event 201 may include, for example, loss of lock, Forward Error Correction (FEC) error, loss of frame/packet, bit error, block error, and/or other events indicating an error associated with the optical transponder.

At block 510, the method 500 may include generating a second timestamped log entry to indicate a timing of the data path event. For example, the method 500 may include obtaining a second timestamp from a clock source (such as the clock source 204 in examples that use a single clock source for both the first and second timestamps) and generating the second timestamped log entry with the second timestamp and information indicating the data path event.

At block 512, the method 500 may include determining that the data path event was caused by the control based on the first timestamped log entry and the second timestamped log entry. For example, the method 500 may include correlated timestamped log entries in the control events 122 (which may store the first timestamped log entry) and trace events 124 (which may store the second timestamped log entry) datastores. Generally speaking, the method 500 may include determining that a control in the control events 122 caused a data path event in the trace events 124 based on timestamps in their respective timestamped log entries. In particular, the method 500 may include determining that the control logged in the first timestamped log entry caused the data path event logged in the second timestamped log entry based on a time delta that indicates a difference in time between the first timestamp and the second timestamp. In some examples, if the time delta is within a predefined amount of time (and the second timestamp indicates a time after the first timestamp), the method 500 may determine that the control (having the first timestamp) caused the data path event (having the second timestamp).

At block 514, the method 500 may include assessing operation of the optical transponder based on the determination that the data path event was caused by the control. In some examples, assessing operation of the optical transponder may include generating one or more results of the testing to be displayed via a user interface, such as UI 120. Such results may include the data path event and correlated control that caused the data path event.

Figure 6:
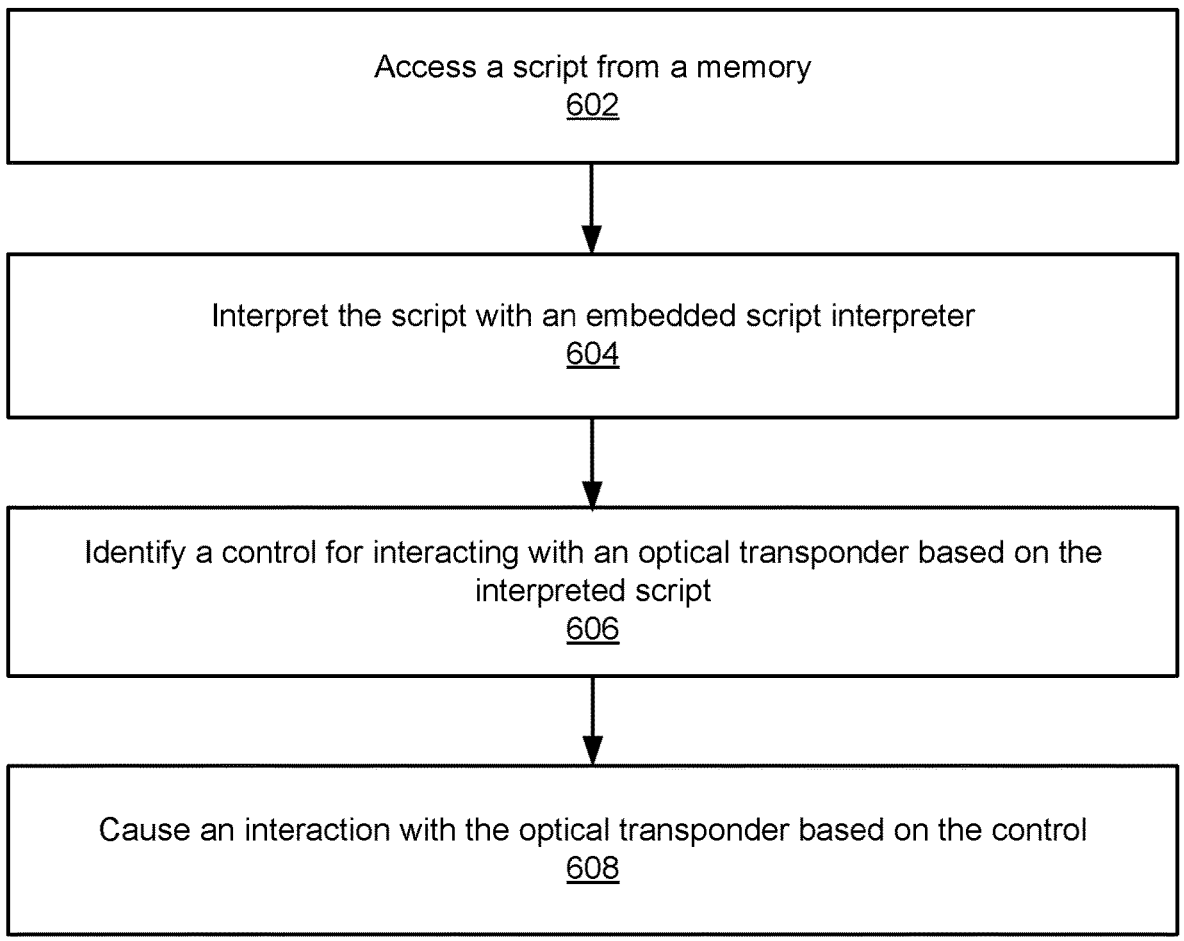
FIG. 6 depicts an example method of generating controls for an optical transponder based on interpreted scripts.

FIG. 6 depicts an example method 600 of generating controls for an optical transponder 121 based on interpreted scripts 111. At block 602, the method 600 may include accessing a script from a memory. At block 604, the method 600 may include interpreting the script with an embedded script interpreter. For example, the script interpreter may be embedded (stored) at an onboard memory of the apparatus. At block 606, the method 600 may include identifying a control for interacting with an optical transponder based on the interpreted script. At block 608, the method 600 may include causing an interaction with the optical transponder based on the control. For example, the method 600 may include transmitting the control to the optical transponder.

Figure 7:
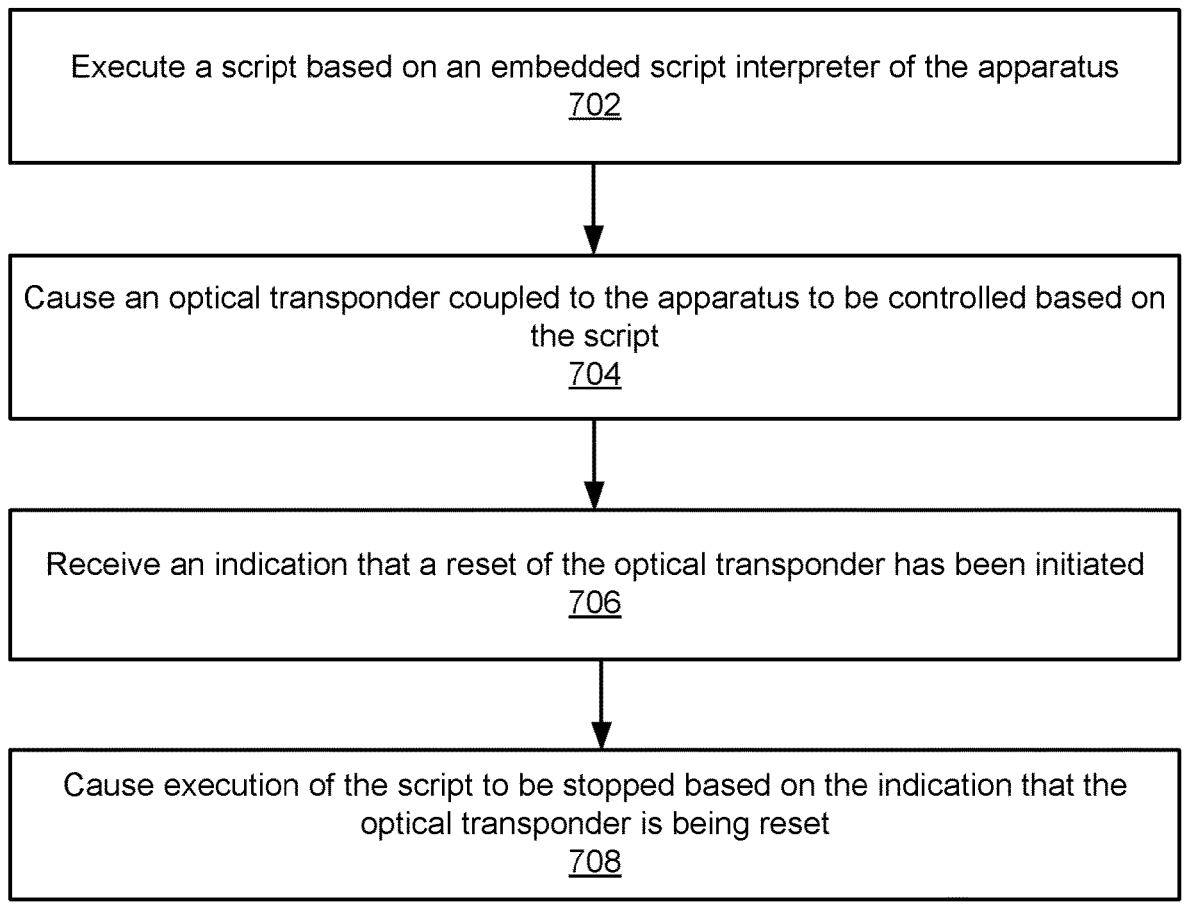
FIG. 7 depicts an example method of automatically restarting scripts executing at the apparatus.

FIG. 7 depicts an example method 700 of automatically restarting scripts executing at the apparatus 100. At block 702, the method 700 may include executing a script (such as script 111) based on an embedded script interpreter (such as script interpreter 110) of the apparatus. At block 704, the method 700 may include causing an optical transponder coupled to the apparatus to be controlled based on the script. At block 706, the method 700 may include receiving an indication that a reset of the optical transponder has been initiated.

At block 708, the method 700 may include causing execution of the script to be stopped based on the indication that the optical transponder is being reset. For example, the script 111 may be suspended, as will be described further with respect to FIG. 8C, or aborted, as will be described further with respect to FIG. 8B. In some examples, the method 700 may include receiving an indication that the reset is complete; and resuming (as in FIG. 8C) or restarting (as in FIG. 8) the script 111 in response to the indication that the reset is complete.

Some or all of the operations set forth in the methods 500-700 may be included as utilities, programs, or subprograms, in any desired computer accessible medium. In addition, the methods 500-700 may each be embodied by computer programs, which may exist in a variety of forms. For example, some operations of the methods 500-700 may exist as machine-readable instructions, including source code, object code, executable code or other formats. Any of the above may be embodied on a non-transitory computer readable storage medium. Examples of non-transitory computer readable storage media include computer system RAM, ROM, EPROM, EEPROM, and magnetic or optical disks or tapes. It is therefore to be understood that any electronic device capable of executing the above-described functions may perform those functions enumerated above.

Figure 8A:
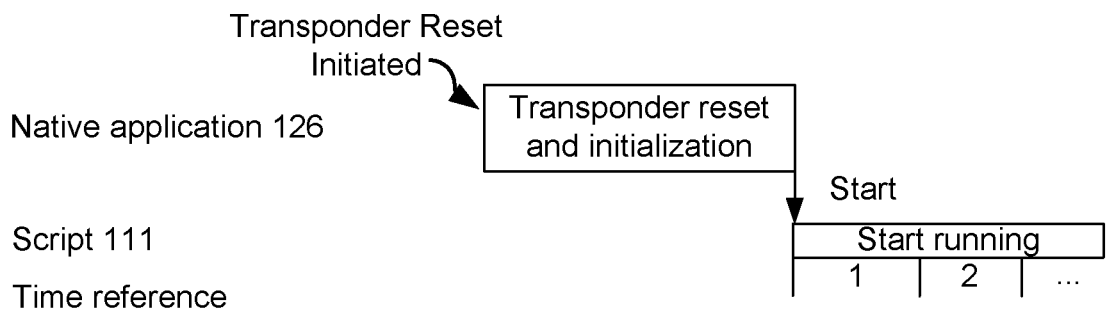
FIG. 8A shows a block diagram of an example of execution of a script that is started in response to a transponder reset.
Figure 8B:
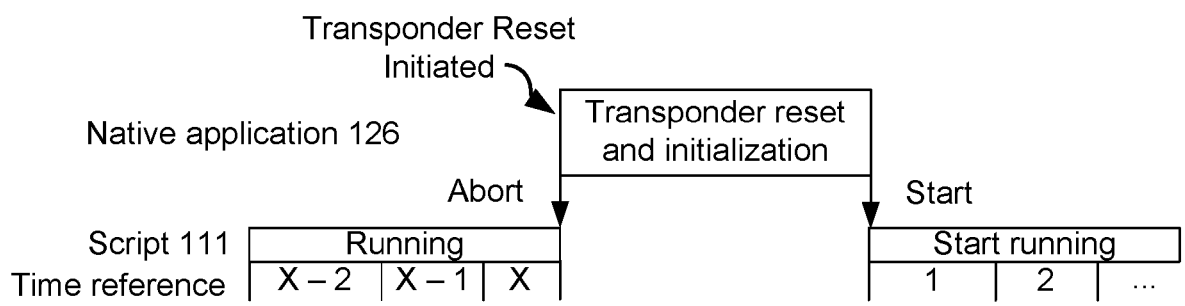
FIG. 8B shows a block diagram of an example of execution of a script that is aborted and then restarted in response to a transponder reset.
Figure 8C:
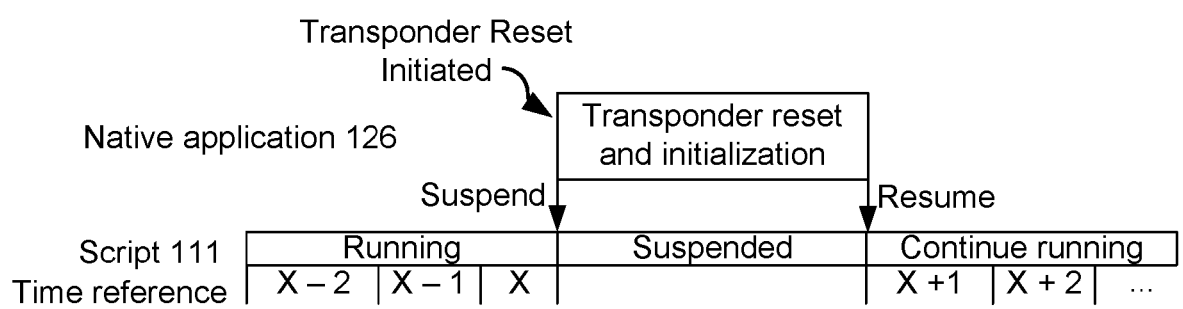
FIG. 8C shows a block diagram of an example of execution of a script that is suspended by a transponder reset.

Attention will now turn to operational starting, suspension, or restarting of a script 111 with reference to FIGS. 8A-8C. FIGS. 8A-8C may refer to the features of FIG. 1. FIG. 8A shows a block diagram 800A of an example of execution of a script 111 that is started in response to a transponder reset. A transponder reset and initialization may be triggered by a user (user-initiated), detection of optical transponder 121 being coupled (e.g., plugged in) to the apparatus 100, a native application 126 (such as an ONT application) being loaded, the script 111 being initiated manually by a user or otherwise, and/or other triggers. The script 111 in examples illustrated in FIG. 8A may be referred to as "auto-start scripts" since they start running, or are otherwise initiated to execute, in response to a transponder reset and initialization (at Time reference 1). Auto-start scripts may be used for automatic transponder configuration. In these instances, auto-start scripts are automatically started every time transponder reset and initialization has been performed. Auto-start scripts may be started after transponder reset and initialization is complete. The amount of optical transponder initialization/configuration by the apparatus 100 (such as an ONT device) may be based on the transponder type and/or the active transponder management mode (such as whether "Manual", "Semi-manual", "Auto," etc.).

FIG. 8B shows a block diagram 800B of an example of execution of a script 111 that is aborted and then restarted in response to a transponder reset. The transponder reset may be triggered based on a user-initiated reset (such as a user pressing a reset button on UI 120), application loaded, a detection of an optical transponder being coupled to (plugged in) the apparatus 100, initiation by script 111, and/or other triggers. Script 111 may be executing at time references X-2, X-1, and X. Upon transponder reset, execution of script 111 may be aborted after time reference X. When the transponder reset is finished (optical transponder 121 has been restarted), then the script 111 may also be restarted at time reference 1. In this example, the script 111 does not resume operation, but rather is restarted.

FIG. 8C shows a block diagram 800C of an example of execution of a script 111 that is suspended by a transponder reset. The transponder reset in the example illustrated in FIG. 8C is similar to the transponder reset illustrated in FIG. 8B except that the transponder reset in FIG. 8C may result in suspension of the script 111 rather than an abort and then restart. Script 111 may be executing at time references X-2, X-1, and X. Upon transponder reset, execution of script 111 may be suspended after time reference X. When the transponder reset is finished (optical transponder 121 has been restarted), then the script 111 may resume operation from the time that the suspension started.

Referring to FIGS. 8A-8C, script 111-initiated transponder resets may be intercepted by the native application 126 (such as ONT software). For example, when a script 111 performs an operation leading to a transponder reset, the operation may be intercepted by the native application. To do so, the native application 126 may monitor transponder reset pin accesses and/or monitoring register write accesses. After interception, the native application 126 may initiate the reset and initialization sequence.

Figure 9A:
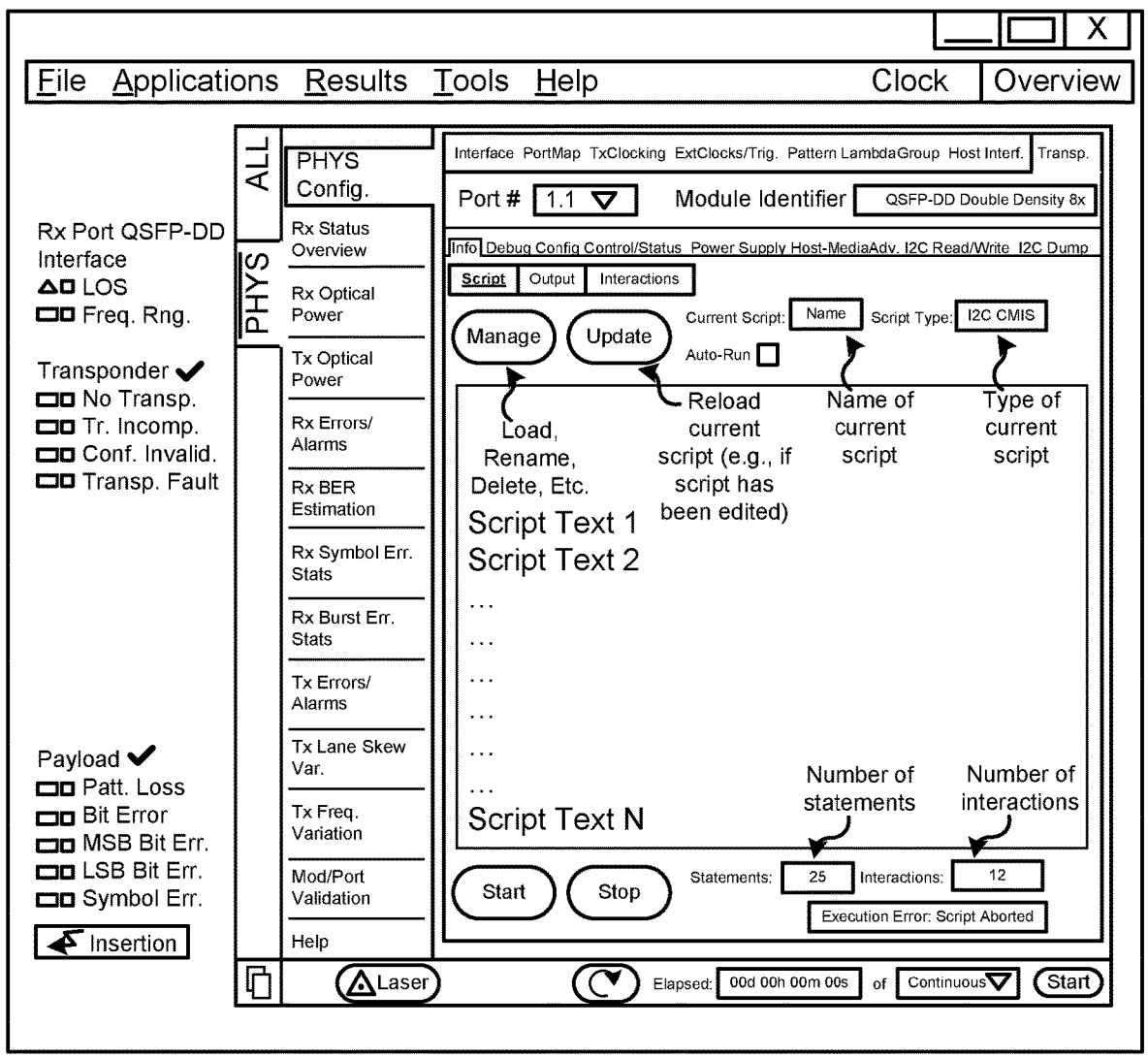
FIGS. 9A-F respectively each depicts an example of a screenshot of a user interface (UI) for transponder management testing and interaction tracking.

FIGS. 9A-F respectively each depicts an example of a screenshot 900A-F of a user interface (such as UI 120) for transponder management testing and interaction tracking. FIG. 9A depicts an example of a screenshot 900A of a UI 120 for viewing, loading, and editing scripts 111 for storage and/or execution at the apparatus 100.

Figure 9B:
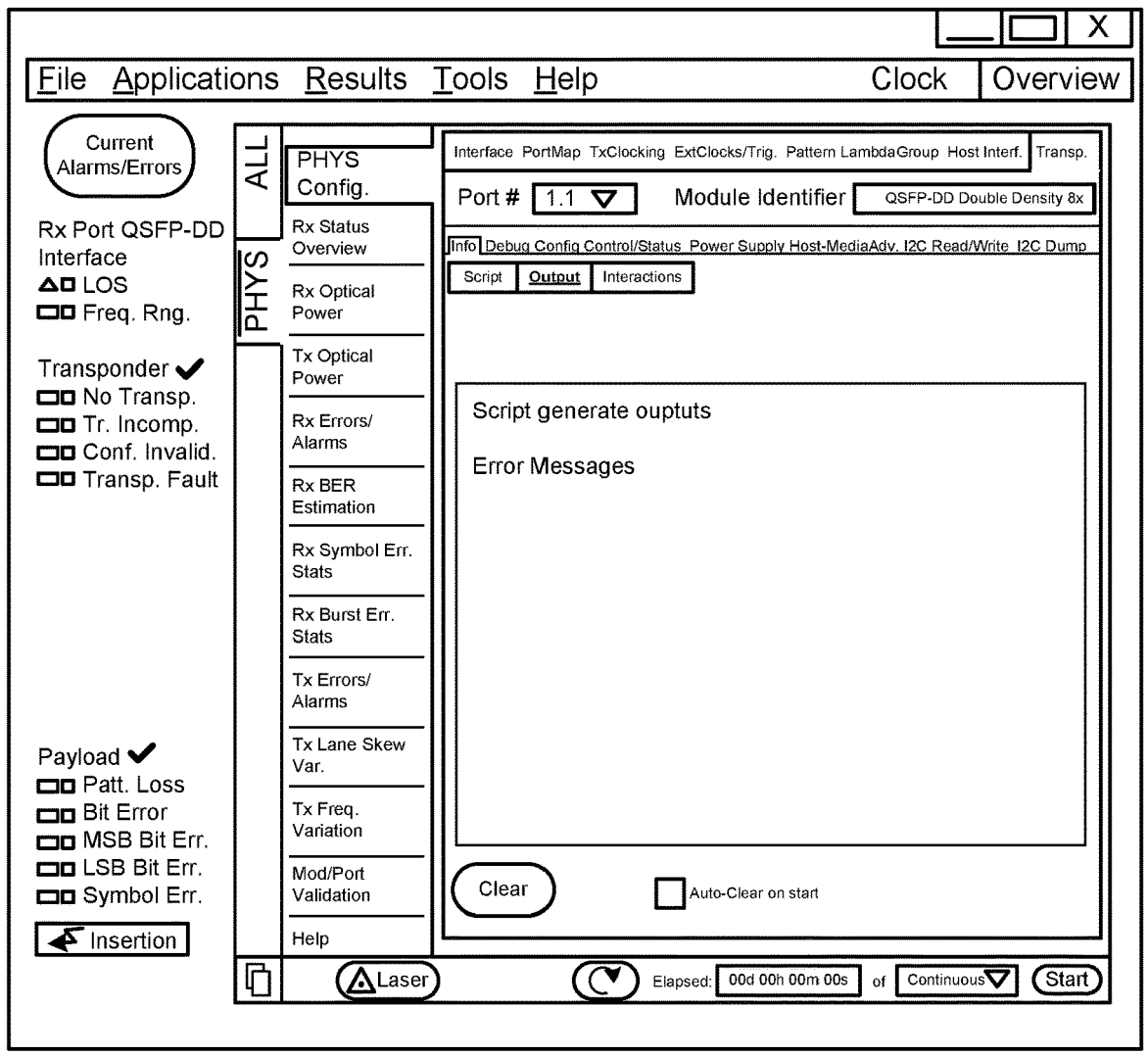
Figure 9C:
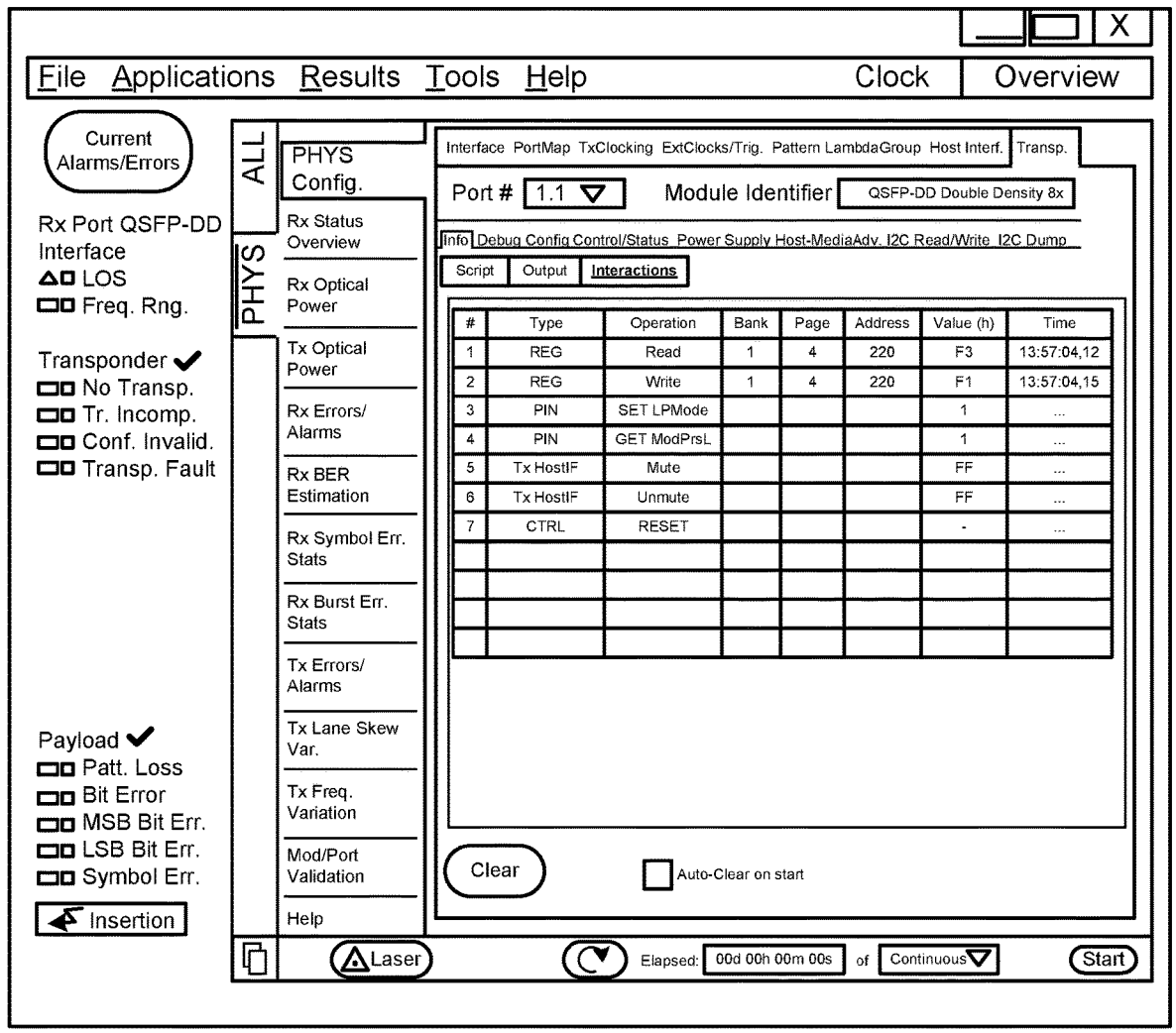
Figure 9D:
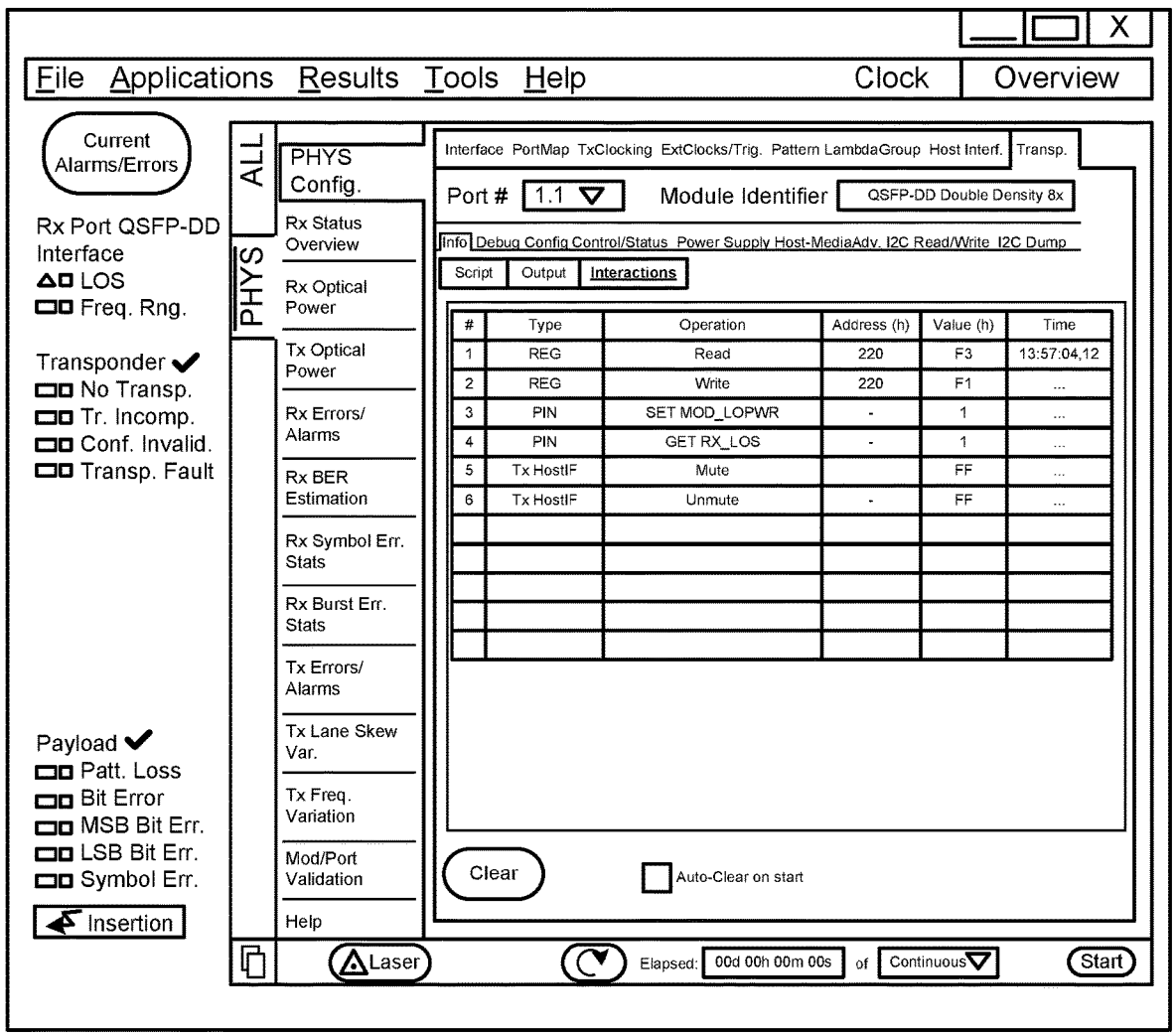
Figure 9E:
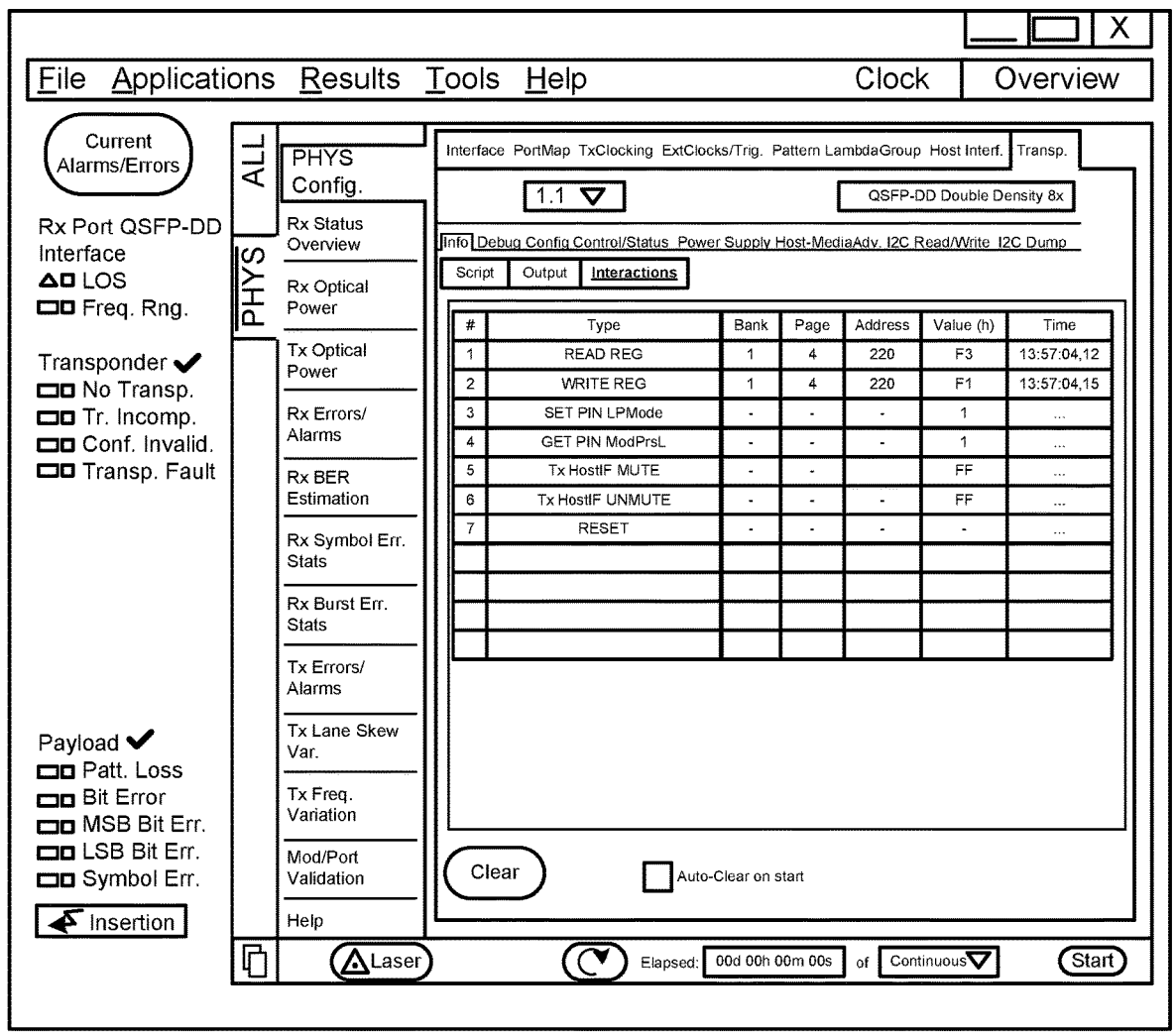
Figure 9F:
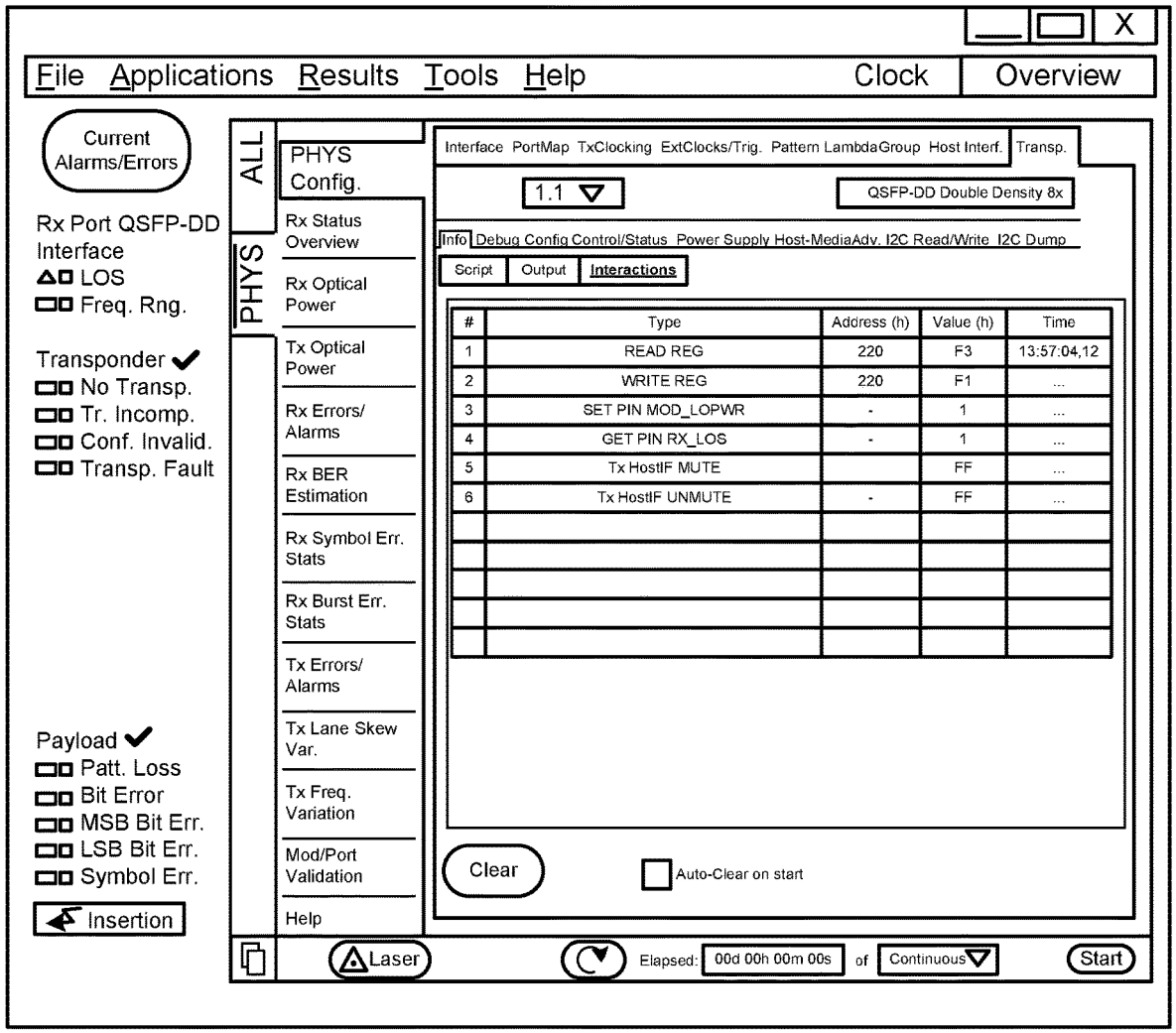

FIG. 9B depicts an example of a screenshot 900B of a UI 120 for displaying script 111-generated messages. FIG. 9C depicts an example of a screenshot 900C of a UI 120 for displaying I2C interaction traces (such as from the control events 122 and/or the trace events 124). FIG. 9D depicts an example of a screenshot 900D of a UI 120 for displaying MDIO interaction traces (such as from the control events 122 and/or the trace events 124). FIG. 9E depicts an example of a screenshot 900E of a UI 120 for an alternative way of displaying I2C interaction traces (such as from the control events 122 and/or the trace events 124). FIG. 9F depicts an example of a screenshot 900F of a UI 120 for an alternative way of displaying MDIO interaction traces (such as from the control events 122 and/or the trace events 124).

In some examples, the apparatus 100 shown in FIG. 1 may perform transponder management testing. As such, the apparatus 100 may be referred herein throughout as a "testing instrument," "testing device," or the like. In some examples, the apparatus 100 may be a component such as an optical network terminal ("ONT") in an optical network, a computing device such as a laptop device, or the like.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure. For instance, although examples of a script described herein throughout refer to an interpreted script, the script may be a compiled script. In this example, the script interpreter may be a script compiler that compiles the source of the script into a binary, or machine-language, executable program.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. A test instrument, comprising:
an electrical interface to couple the test instrument to an optical transponder;
a memory to store a script, the script encoding a test of the optical transponder, the test comprising a plurality of interactions with the optical transponder to be traced and analyzed; and a controller to:
identify a script type for the script, wherein a plurality of language features for a script interpreter that interprets the script is based on the script type, wherein each of the plurality of language features dictates a characteristic related to the optical transponder;
interpret the script to identify a control for the optical transponder based on a statement included in the script;
cause, via the electrical interface, an interaction with the optical transponder to occur based on the control;
generate a first timestamped log entry to indicate a timing of the control;
detect a data path event associated with the optical transponder;
generate a second timestamped log entry to indicate a timing of the data path event;
determine that the data path event was caused by the control based on the first timestamped log entry and the second timestamped log entry; and
assess operation of the optical transponder based on the determination that the data path event was caused by the control.

2. The test instrument of claim 1, wherein the characteristic comprises at least one of: a format of register references, a set of pins that are permitted to be manipulated, a host interface lane range, and traced transaction data.

3. The test instrument of claim 1, wherein to identify the script type, the controller is further to:
access an input that specifies the script type.

4. The test instrument of claim 1, wherein to identify the script type, the controller is further to:
automatically identify the script type based on the optical transponder.

5. The test instrument of claim 1, wherein to identify the script type, the controller is further to:
automatically identify the script type based on a type of port used for coupling to the optical transponder.

6. The test instrument of claim 1, wherein the statement encodes a control of a transponder management interface operation of the optical transponder.

7. The test instrument of claim 6, wherein the transponder management interface operation comprises a read or write of a register of the optical transponder.

8. The test instrument of claim 1, wherein the statement encodes a manipulation of a host interface signal of the optical transponder.

9. The test instrument of claim 8, wherein the manipulation of the host interface signal comprises muting or unmuting of the host interface signal.

10. The test instrument of claim 1, wherein the statement encodes a manipulation of a power supply of the optical transponder.

11. The test instrument of claim 1, wherein the statement encodes a manipulation of a hardware pin of the optical transponder.

12. The test instrument of claim 11, wherein the manipulation comprises a get or set function of the hardware pin.

13. An optical network tester (ONT) device, comprising:
a memory to store a script interpreter and a script;
an electrical interface to couple the ONT device to an optical transponder; and
a controller coupled to the electrical interface, the controller to execute the script interpreter to:
identify a script type for the script, wherein a plurality of language features for the script interpreter that interprets the script is based on the script type, wherein each of the plurality of language features dictates a characteristic related to the optical transponder;
access the script from the memory;
interpret the script with the script interpreter;
identify a control for interacting with the optical transponder based on the interpreted script; and
cause an interaction with the optical transponder based on the control.

14. The ONT device of claim 13, wherein the script interpreter is further to constrain one or more controls of the optical transponder based on the script type.

15. The ONT device of claim 13, wherein the controller is further to:
detect a data path event associated with the optical transponder; and
determine that the data path event was caused by the control.

16. The ONT device of claim 15, wherein to detect the data path event, the controller is further to use a native data path tracer to trace data path events associated with the optical transponder.

17. The ONT device of claim 15, wherein to detect the data path event, the controller is further to use the script interpreter to trace data path events associated with the optical transponder.

18. A method comprising:
identifying, by an apparatus, a script type for a script, wherein a plurality of language features for a script interpreter that interprets the script is based on the script type, wherein each of the plurality of language features dictates a characteristic related to an optical transponder;
executing, by the apparatus, the script based on an embedded script interpreter of the apparatus;
causing, by the apparatus, the optical transponder coupled to the apparatus to be controlled based on the script;
receiving, by the apparatus, an indication that a reset of the optical transponder has been initiated; and
causing, by the apparatus, execution of the script to be stopped based on the indication that the optical transponder is being reset.

19. The method of claim 18, wherein causing the execution of the script to be stopped comprises suspending or aborting the script, the method further comprising:
receiving an indication that the reset is complete; and
resuming or restarting the script in response to the indication that the reset is complete.

* * * * *